(12) United States Patent
Frisken

(10) Patent No.: US 7,092,599 B2
(45) Date of Patent: Aug. 15, 2006

(54) WAVELENGTH MANIPULATION SYSTEM AND METHOD

(75) Inventor: Steven James Frisken, Vaucluse (AU)

(73) Assignee: Engana PTY LTD, Sydney (AU)

( * ) Notice: Subject to any disclaimer, the term of this patent is extended or adjusted under 35 U.S.C. 154(b) by 183 days.

(21) Appl. No.: 10/706,901

(22) Filed: Nov. 12, 2003

(65) Prior Publication Data

US 2005/0100277 A1    May 12, 2005

(51) Int. Cl.
*G02B 6/34* (2006.01)
*G02B 6/293* (2006.01)

(52) U.S. Cl. .......................... 385/37; 385/24
(58) Field of Classification Search ............... 385/24, 385/33, 37; 398/84
See application file for complete search history.

(56) References Cited

U.S. PATENT DOCUMENTS

| | | | |
|---|---|---|---|
| 6,441,959 B1 * | 8/2002 | Yang et al. ................. | 359/495 |
| 6,485,149 B1 | 11/2002 | Berg et al. | |
| 6,556,320 B1 * | 4/2003 | Cao ............................. | 398/65 |
| 6,634,810 B1 | 10/2003 | Ford et al. | |
| 6,707,959 B1 | 3/2004 | Ducellier et al. | |
| 6,766,081 B1 * | 7/2004 | Weaver et al. ................ | 385/39 |

FOREIGN PATENT DOCUMENTS

| | | |
|---|---|---|
| CA | 2245389 A1 | 2/2000 |
| WO | WO 02/103447 A1 | 12/2002 |

* cited by examiner

*Primary Examiner*—John D. Lee
(74) *Attorney, Agent, or Firm*—Townsend and Townsend and Crew LLP

(57) ABSTRACT

A wavelength selective manipulation device and method including: at least a first optical input port for inputting an optical signal including a plurality of wavelength channels; a first wavelength dispersing element for angularly dispersing the wavelength channels of the optical signal into angularly dispersed wavelength signals; an optical power element for focussing in the angularly dispersed dimension the angularly dispersed wavelength signals into a series of elongated spatially separated wavelengths bands; a spatial manipulation element for selectively manipulating the spatial characteristics of the spatially separated wavelength bands to produce spatially manipulated wavelength bands.

25 Claims, 10 Drawing Sheets

WAVELENGTH MANIPULATION SYSTEM AND METHOD

FIELD OF THE INVENTION

The present invention relates to an optical switching systems and, in particular, discloses a wavelength selective switch having possible attenuation control characteristics.

BACKGROUND OF THE INVENTION

In optical communications systems, the use of wavelength selective switching for applications of optical cross-connects has attracted much interest because of the goal of fully flexible, networks where the paths of each wavelength can be reconfigured to allow arbitrary connection between nodes with the capacity appropriate for that link at a particular point in time. Although this goal is still valid, it is clear that optical networks will evolve to this level of sophistication in a number of stages—and the first stage of the evolution is likely to be that of a reconfigurable add/drop node where a number of channels can be dropped and added from the main path, whose number and wavelength can be varied over time—either as the network evolves or dynamically as the traffic demands vary.

This present invention is directed to applications such as reconfigurable optical add/drop multiplexer (ROADM) networks and is scalable to the application of wavelength reconfigurable cross-connects referred to generically as Wavelength Selective Switchs (WSS).

The characteristics of a wavelength selective element which is ideal for the applications of Optical Add/drop and Wavelength selective switching can be summarized follows:
  i) scalable to multiple fibre ports
  ii) one channel per port or multiple channels per port operation
  iii) reconfiguration of wavelength selectivity to different grids eg/50 GHz or 100 GHz or a combination of both
  iv) low optical impairment of the express path
  v) low losses on the drop and express paths
  vi) ability to add and drop wavelengths simultaneously
  vii) ability to reconfigure between any ports or between any wavelengths without causing transient impairments to the other ports
  viii) equalisation of optical power levels on express path (OADM) or all paths (WSS)
  ix) provision of shared optical power between ports for a given wavelength (broadcast mode)
  x) flat optical passband to prevent spectral narrowing
  xi) power off configurations that leave the express path of an OADM undisturbed
  xii) small power and voltage and size requirements.

In reviewing the many technologies that have been applied it is necessary to generalize somewhat, but the following observations can be made.

Two basic approaches have been made for the OADM and WSS applications.
  i) The first has been based on wavelength blocking elements combined with a broadcast and select architecture. This is an optical power intensive architecture, which can provide for channel equalization and reconfiguration of wavelength selectivity, but is not scalable to multiple ports, has very high loss and because of the many auxiliary components such as wavelength tuneable filters has a large power and footprint requirement.
  ii) Wavelength switches have been proposed for OADMs, but do not naturally provide for channel equalization, the channel by channel switching in general leads to dispersion and loss narrowing of optical channels, and in the case of multiple port switches it is generally not possible to switch between ports without causing impairment (a hit) on intermediate ports. In addition the channel spacing cannot be dynamically reconfigured. Tuneable 3-port filters have also been proposed having a lack of impairment to the express paths but do not scale easily to multiple ports and may suffer from transient wavelength hits during tuning. Tuneable components are usually locked to a particular bandwidth which cannot be varied. In addition poor isolation of tuneable 3 ports means they are less applicable to many add/drop applications which demand high through path isolation.

One technology that has been applied to optical cross connects has become known as 3-D MEMs utilises small mirror structures which act on a beam of light to direct it from one port to another. Examples of this art are provided in U.S. Pat. Nos. 5,960,133 and 6,501,877. The ports are usually arranged in a 2 dimensional matrix and a corresponding element of the 2 dimensional array of mirrors can tilt in two axis to couple between any one of the ports. Usually two arrays of these mirrors are required to couple the light efficiently and because of the high degree of analogue control required structures based on this technology have proved to be extremely difficult to realize in practice and there are few examples of commercially successful offerings. In this type of structure, a separate component is required to separate each wavelength division multiplexed (WDM) input fibre to corresponding single channel/single fibre inputs.

One of the most promising platforms for wavelength routing application relies on the principle of dispersing the channels spatially and operating on the different wavelengths, either with a switching element or attenuation element. These technologies are advantageous in that the switching element is integrated with the wavelength dispersive element—greatly simplifying the implementation. The trade-off is that in general the switching is more limited, with most implementation demonstrated to date being limited to small port counts—and the routing between ports is not arbitrary. In general a diffraction grating is used for micro-optic implementations or an Array waveguide grating for waveguide applications. Most of the switching applications have been based on MEMS micro mirrors fabricated in silicon and based on a tilt actuation in one dimension. The difficulty with this approach has been that to achieve the wavelength resolution required when the angular dispersion is mapped to a displacement. In such cases, an image of the fibre (with or without magnification) is mapped onto the tilt mirror array. In order to couple the light into a second port, additional optical elements are required that convert the angle into a displacement. Different approaches to this have included retroreflection cubes wedges (U.S. Pat. No. 6,097,519) which provide discrete displacements or Angle to Displacement elements (U.S. Pat. No. 6,560,000) which can provide continuous mapping using optical power provisioned at the Rayleigh length of the image. In all of these cases, in order to switch between ports, the tilt mirror needs to pass through the angles corresponding to intermediate ports. In addition, the number of ports is limited in each of these cases by the numerical aperture of the fiber as each of the different switch positions are discriminated by angles. For a fibre with a numerical aperture of 0.1, a switch which can tilt by +−12 degrees could not distinguish 8 different switch positions. One approach that can be used is to decrease the numerical aperture through the use of thermally expanded cores or micro lenses—but this is done at the expense of wavelength resolution.

An alternative has been to use polarization to switch between ports. Obviously this is most appropriate to switching between 2 ports corresponding to the 2 polarisation states—so is not readily scalable, though more complicated schemes can be envisaged to allow for switching between multiple ports. With polarization switching, the dynamic equalization of channels can be done at the expense of the rejected light being channelled into the second fibre—so it is not applicable to equalization of the express path whilst dropping a number of wavelengths.

SUMMARY OF THE INVENTION

It is an object of the present invention to provide for an improved form of optical switching system.

In accordance with a first aspect of the present invention, there is provided a wavelength selective manipulation device comprising: at least a first optical input port for inputting an optical signal including a plurality of wavelength channels; a first wavelength dispersing element for angularly dispersing the wavelength channels of the optical signal into angularly dispersed wavelength signals; an optical power element for focussing in the angularly dispersed dimension the angularly dispersed wavelength signals into a series of elongated spatially separated wavelengths bands; a spatial manipulation element for selectively manipulating the spatial characteristics of the spatially separated wavelength bands to produce spatially manipulated wavelength bands.

Preferably, the device also includes a first wavelength combining element for selectively combining the spatially manipulated wavelength bands together to produce a first output signal. The first wavelength dispersing element preferably can include a diffraction grating. The optical power element preferably can include a cylindrical lens and the spatial manipulation element can comprise a liquid crystal display device or splatial light modulator (SLM) acing on the phase of the light.

The SLM device can be divided into a series elongated cell regions substantially matching the elongated spatially separated wavelength bands. The cell regions each can include a plurality of drivable cells and wherein, in use, the cells are preferably driven so as to provide a selective driving structure which projects a corresponding optical signal falling on the cell region substantially into one of a series of output order modes. The optical power element also preferably can include a spherical or cylindrical mirror. The diffraction grating can be utilised substantially at the Littrow condition.

In one mode of operation, when the spatial manipulation element is in a first state, first predetermined wavelengths input at the first optical input port are preferably output at a first output port; and when the spatial manipulation element is in a second state, second predetermined wavelengths input at the first optical input port are preferably output at a second output port. Further, when the spatial manipulation element is in the first state, first predetermined wavelengths input at a third optical input port are preferably output at a fourth output port; and when the spatial manipulation element is in a second state, first predetermined wavelengths input at the third optical input port are preferably output at the first output port.

In accordance with a further aspect of the present invention, there is provided a wavelength selective manipulation device comprising: a series of optical input and output ports including a first optical input port inputting an optical signal including a plurality of wavelength channels; a first wavelength separation element for angularly dispersing the wavelength channels of the optical signal into angularly dispersed wavelength signals; a focussing element for focussing in the angularly dispersed dimension the angularly dispersed wavelength signals into a series of elongated spatially separated wavelengths bands; a spatial manipulation element for selectively manipulating the spatial characteristics of the spatially separated wavelength bands to produce spatially manipulated wavelength bands; the spatially manipulated wavelength bands being subsequently focused by the optical power element and combined in a spatially selective manner by the first wavelength separation element for output at the output ports in a spatially selective manner.

In accordance with a further aspect of the present invention, there is provided a method of providing wavelength selective separation capabilities for an optical input signal having multiple wavelength components, the method comprising the steps of: (a) projecting the optical input signal against a grating structure so as to angularly separate the wavelength components; (b) focussing each of the wavelength components in the wavelength dispersed dimension (vertical) into an elongated wavelength component element; (c) independently manipulating the elongated wavelength component element; (d) combining predetermined ones of the manipulated elongated wavelength components.

The focussing step preferably can include utilising a cylindrical lens and spherical mirror to focus the wavelength components. The step (c) preferably can include utilising a liquid crystal display device to separately manipulate each of the wavelength components. The liquid crystal display device can be divided into a series elongated cell regions substantially matching the elongated wavelength components. The cell regions each can include a plurality of drivable cells and wherein, in use, the cells are preferably driven so as to provide a selective driving structure which projects a corresponding optical signal falling on the cell region substantially into one of a series of output order modes.

In accordance with a further aspect of the present invention there is provided a wavelength selective manipulation device comprising: at least a first optical input port for inputting an optical signal including a plurality of wavelength channels; polarisation alignment element for aligning the polarisation state of the optical signal; a wavelength dispersion element for angularly dispersing the wavelength channels of the optical signal into angularly dispersed wavelength signals; an optical power element for focussing in the angularly dispersed wavelength signals into a series of elongated spatially separated wavelengths bands; a spatial manipulation element for selectively spatially manipulating the characteristics of the spatially separated wavelength bands to produce spatially manipulated wavelength bands.

BRIEF DESCRIPTION OF THE DRAWINGS

Preferred forms of the present invention will now be described by way of example only with reference to the accompanying drawings in which.

DESCRIPTION OF PREFERRED AND OTHER EMBODIMENTS

Figure 1:
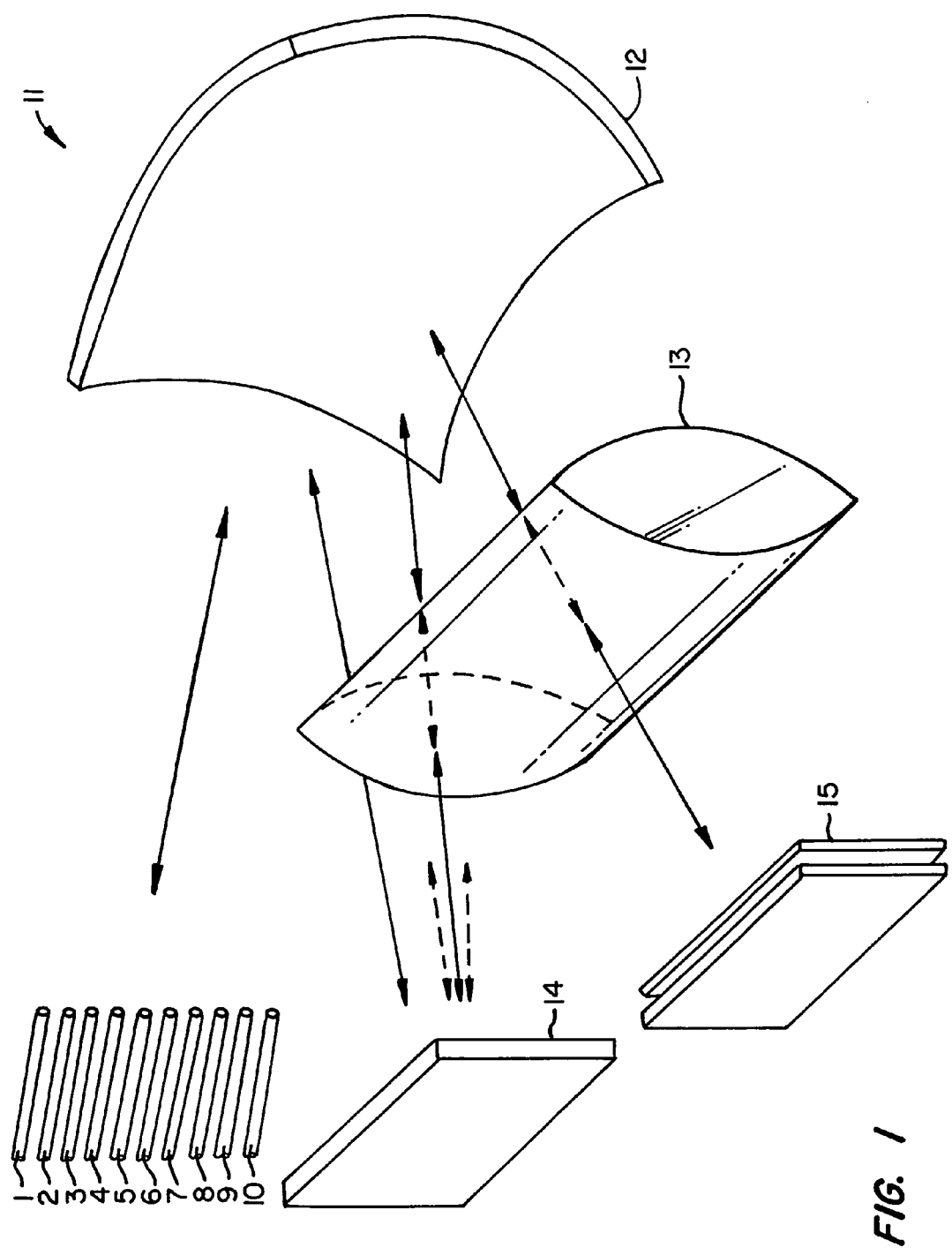
FIG. 1 illustrates schematically a side perspective view of the preferred embodiment.

In the preferred embodiment, an arrangement is provided for each wavelength of light to be dispersed and focused in one axis and collimated in the orthogonal axis such that a mode selecting liquid crystal array or spatial light modulator can be utilised to select between the various orders of the reflective or transmissive diffraction grating as established by the liquid crystal operating on one polarisation state of light. As is well known, for a collimated beam an angular deflection of the beam such as that obtained by changing the order of a reflective diffraction grating will have the effect of translating the focus of the beam. If the optical train is established to be telecentric then this translation is achieved without affecting the coupling efficiency and so can be coupled effectively into a second port located at a given translation from the first post such as would be provided in the case of a fibre array Turning initially to FIG. 1, there is illustrated schematically a side perspective view 11 of the arrangement of the preferred embodiment. An array in the x-dimension of optical input output fibres 1–10 is initially provided with the initial input being along the fibre 3. Each of the fibres can have thermally expanded core ends. The emitted light from core 3 is assumed to be of a single vertical polarisation only (If required, a polarisation alignment means (not shown) can be utilised to obtain the single polarisation light in a known manner). The light is projected to a spherical mirror 12 where it is reflected and collimated before striking a diffraction grating 14. The diffraction grating 14 is arranged at the Littrow condition. At the Littrow condition, as is known in the art, the reflected light is angularly dispersed in the y axis into its spectral components.

The light emitted from the grating 14 will have an angular separation in accordance with wavelengths. The spectral components are reflected back through the cylindrical lens 13 having optical power in the x dimension. The spectral components are focussed in the x dimension near to the mirror 12 but remains collimated in the y dimension. Upon return through the cylindrical lens 13 the spectral components are now collimated in the x dimension but continue to converge in the y dimension so as to focus in that dimension on or near an active or passive Liquid Crystal Display (LCD) device 14 providing a series of elongated spectral bands.

Figure 2:
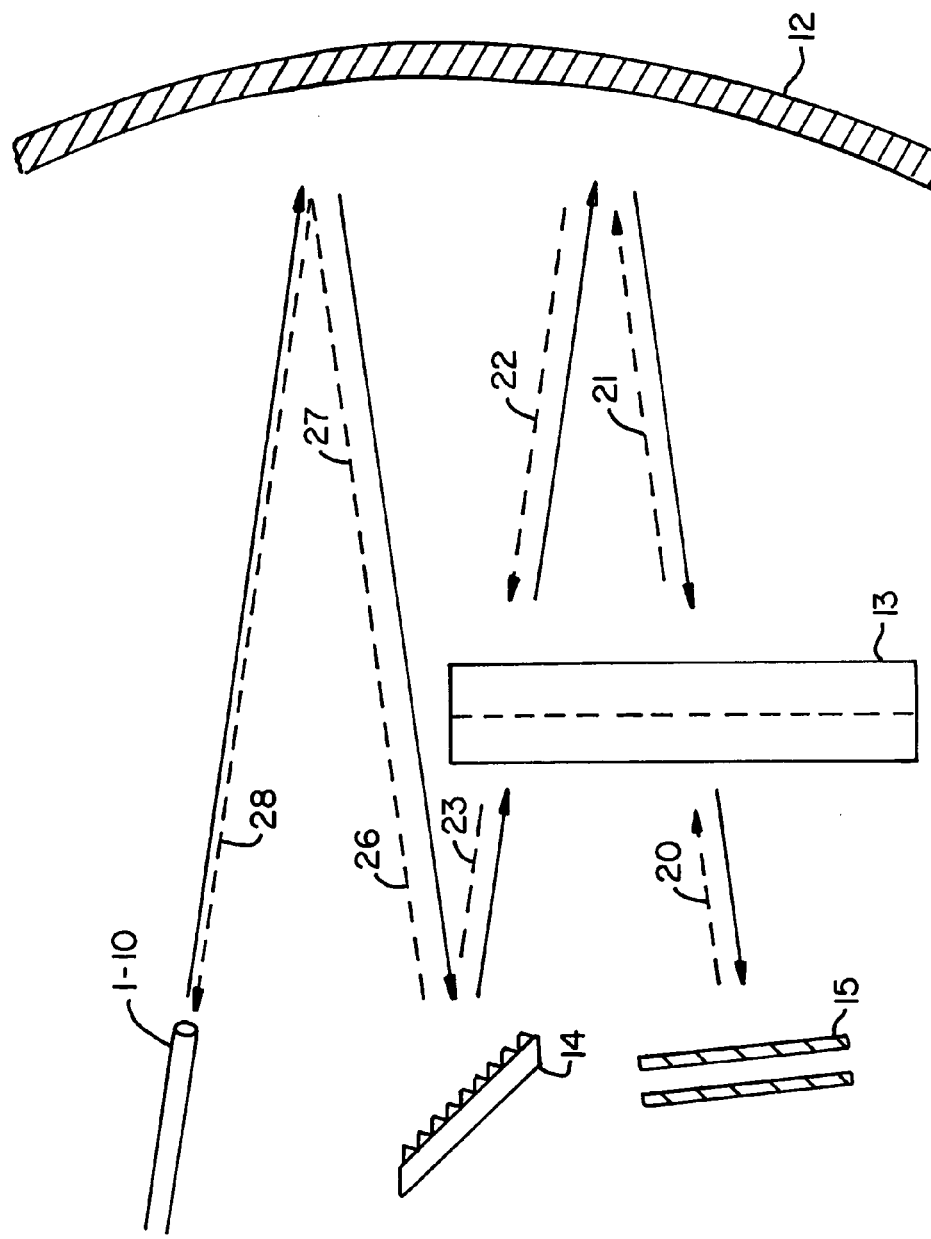
FIG. 2 is a schematic top plan view of the arrangement of the preferred embodiment.

For clarity of understanding, FIG. 2 illustrates a top plan view of the arrangement of FIG. 1. Where the light striking the Liquid Crystal Display 15 undergoes pure reflection, the light traverses the return path 20–23 where it again strikes the grating 14 at the Littrow condition where it is recombined with other frequencies and follows a return paths 26–28 where it passes to output port 8.

The Liquid Crystal Display device 15 can be of an active or passive type with a series of independently controllable areas. It is assumed that the reader is well aware of the understanding of Liquid Crystal Display devices and their operation can be entirely standard. In the first preferred embodiment it is noted that the LCD can be essentially equivalent to that used in Spatial Light Modulators (SLM), in particular a phase only reflective SLM such as that demonstrated by Boulder Nonlinear systems using CMOS technology. The design of the CMOS back plane is readily adapted to the pixel size requirements as would be apparent to one skilled in the art.

In the preferred embodiment we use a reflective LCD device and we illustrate for the case of selection between a purely reflective and 4 different diffraction states. The proposed structure is also designed to achieve high extinction between the selected order and the other orders and also the reflective state. This is achieved by the use of symmetry to ensure that at each of the modes not selected or the purely reflective state the integral of the phase of the components goes to zero in theory. Although higher order diffractions can be excited with some efficiency proper choice of cell size (which determine the slit diffraction numerical aperture) can limit this to small fractions and achieve high through-put.

Figure 4:
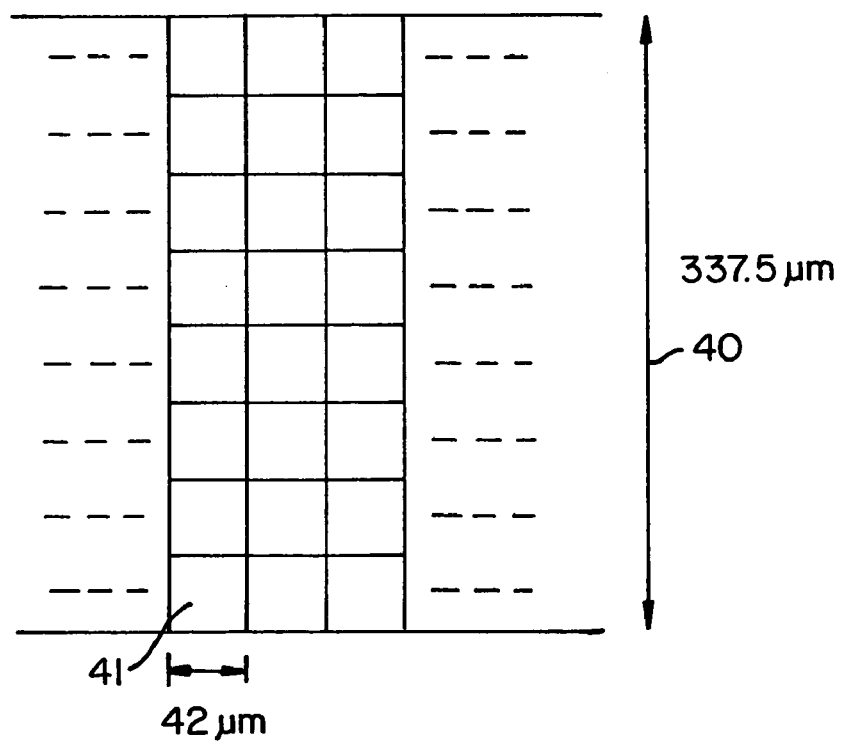
FIG. 4 illustrates schematically the arrangement of cells on a Liquid Crystal Display device.
Figure 5:
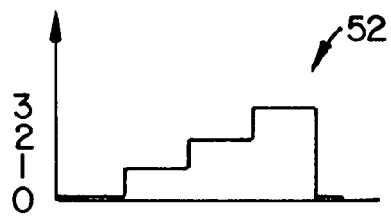
FIG. 5–FIG. 9 illustrate various driving arrangements for producing different diffractive orders.
Figure 5:
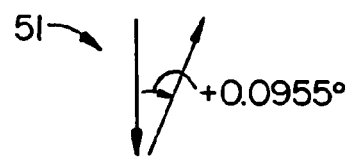

The order-selection mechanism relies on varying the retardation in the sub cells of the induced grating structure in a way that achieves the necessary selectivity and extinction. In this example a simplified drive is achieved by the use of only 4 levels:

State 0:4$\lambda$/8 retardance
State 1:3 $\lambda$/8 retardance
State 2:2 $\lambda$/8 retardance
State 3:$\lambda$/8 retardance Ideally, the reflected light from the LCD is controlled so that different diffraction orders correspond to different angles of propagated light. In the example given, the first order of diffraction is assumed to be at 0.0955 degrees. By controlling the Liquid Crystal Display device, selective excitation of the positive or negative first order of diffraction line can be achieved. This corresponds to a spatial periodicity of 377.5 µm. Hence, as illustrated in FIG. 4, the diffraction line 40 is assumed to be 337.5 µm in length and is divided into 8 cells 41 with each cell being approximately 42 µm in length. This can be readily achieved utilising standard lithographic techniques for the electrode structure.

Figure 3:
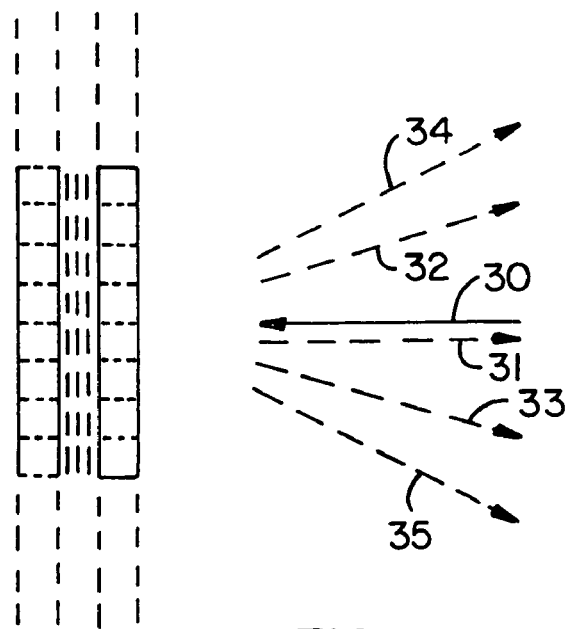
FIG. 3 illustrates schematically the operation of reflective modes.

In a first embodiment, the Liquid Crystal Display device is utilised to form a reflective diffraction grating such that, as illustrated in FIG. 3, input light 30 is output selectively either in a fully reflective manner 31, to the first order 32, 33 or to the second orders 34, 35.

Figure 6:
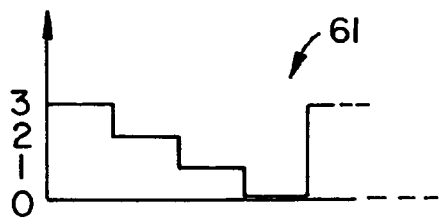
Figure 6:
Figure 7:
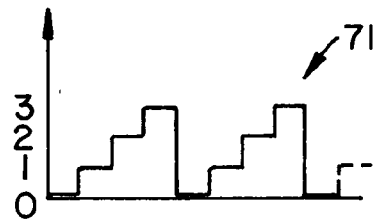
Figure 7:
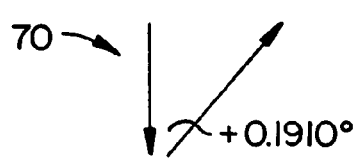
Figure 8:
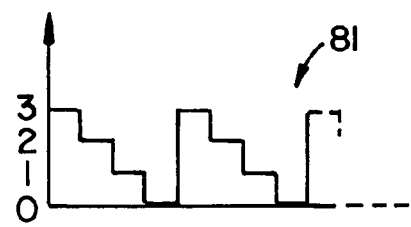
Figure 8:
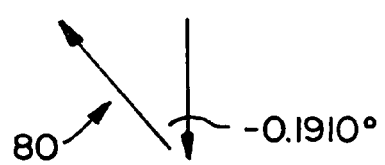
Figure 9:
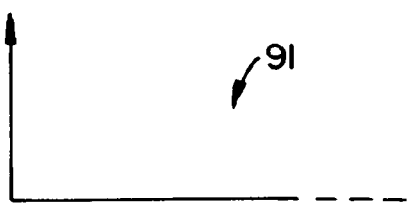
Figure 9:
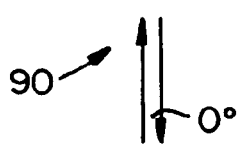
Figure 10A:
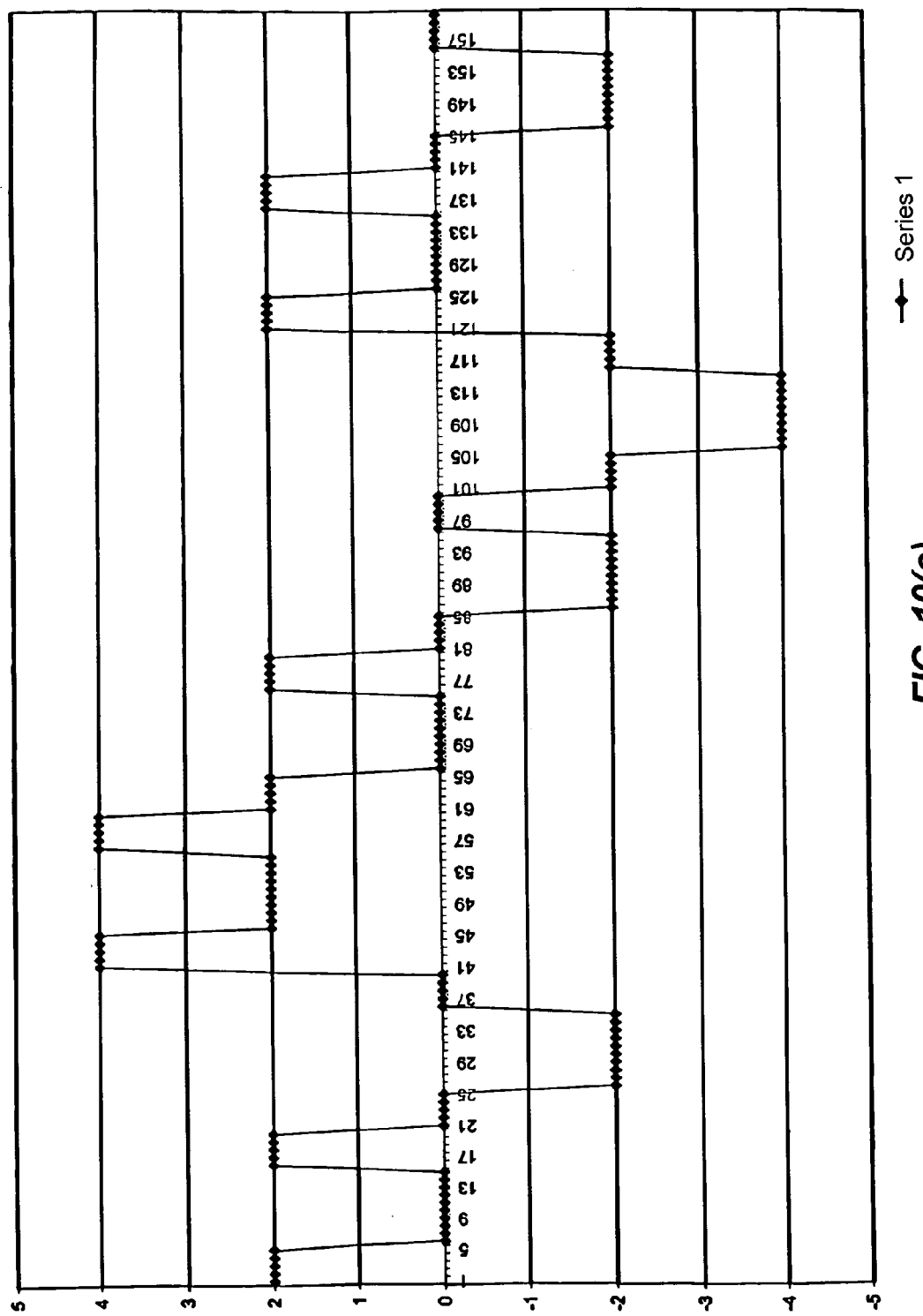
FIG. 10(a) to FIG. 10(d) illustrates the driving arrangement for an AC driving of a Liquid Crystal type display.
Figure 10B:
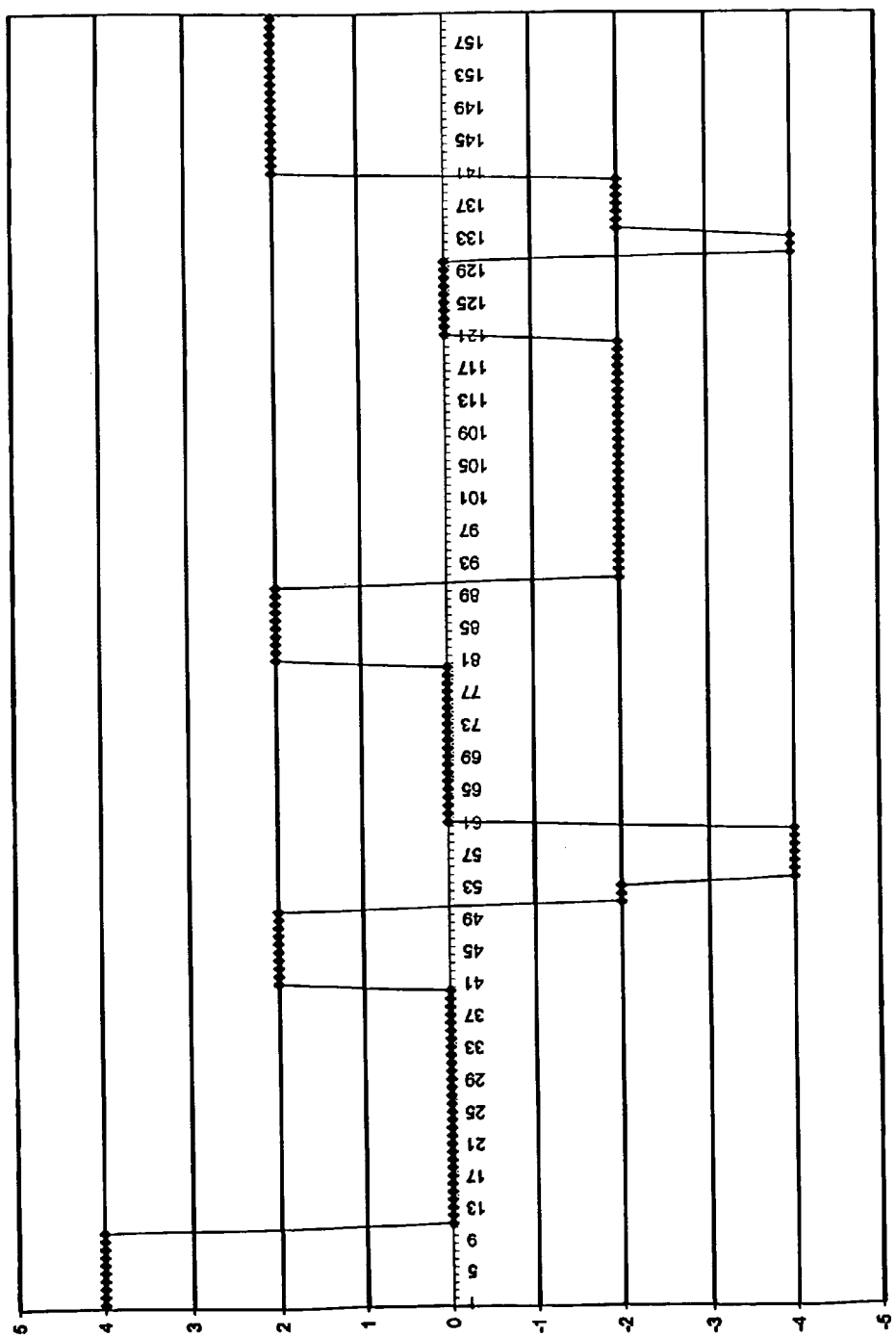
Figure 10C:
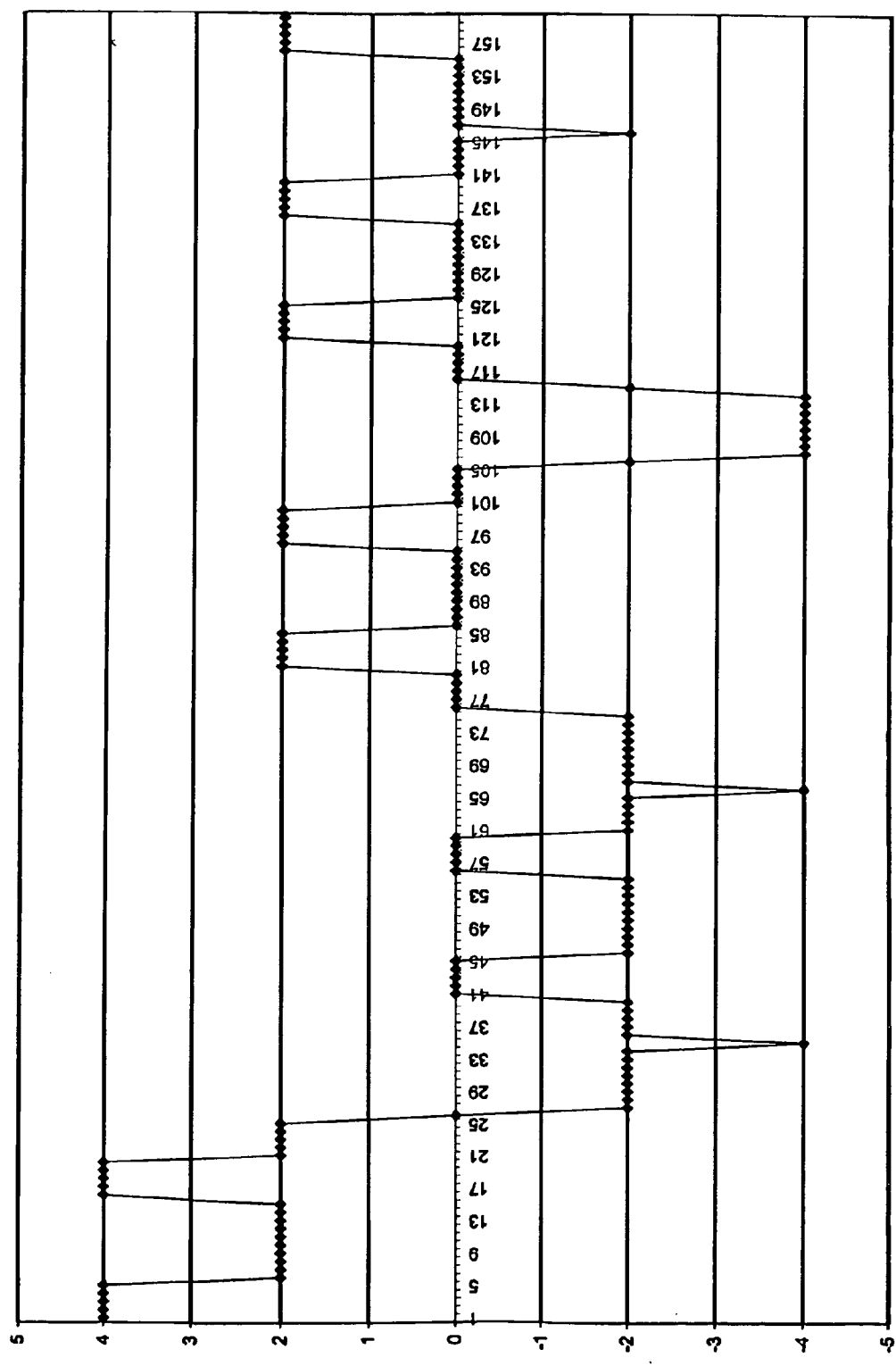
Figure 10D:
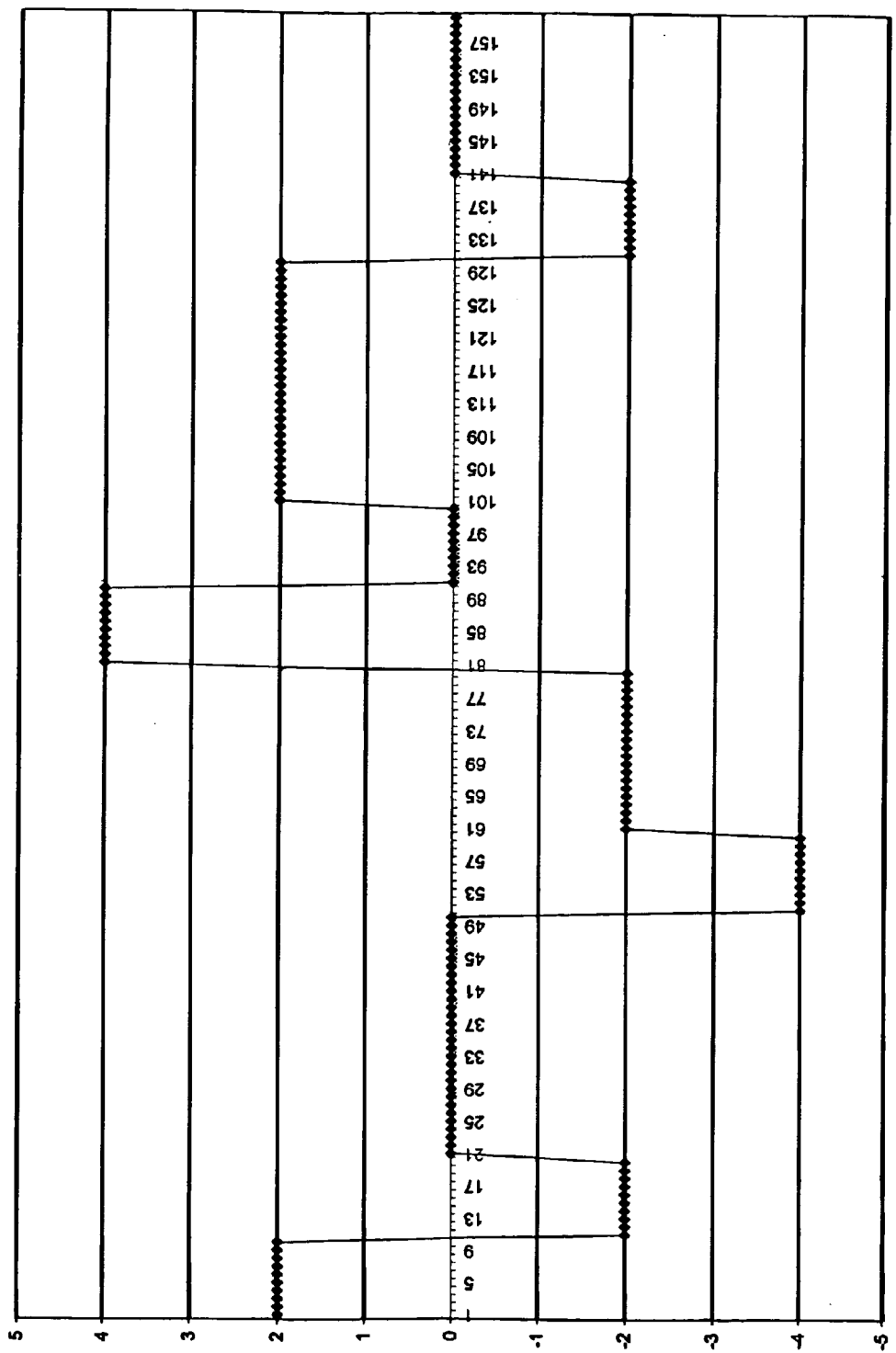

The cells of the Liquid Crystal structure can be driven so as to select the output order. FIG. 5–FIG. 9 illustrates one form of the various possible driving arrangements for the 8 cells. In a first arrangement in FIG. 5, designed to produce a 0.0955 first order deflection, the driving state can be as illustrated 52 with the states being 0,0,1,1,2,2,3,3. In FIG. 6, for the negative first order 60, the driving states can be 3,3,2,2,1,1,0,0. In FIG. 7, for the second order output 70, the driving states 71 can be 0,1,2,3,0,1,2,3. Next in FIG. 8, for the negative second output order 80, the driving states 81 can be 3,2,10,3,2,1,0. Finally, in FIG. 9, for the purely reflective state 90, the driving state 91 can be all 0's.

Each of these modes can then be used in the arrangement of FIG. 1 and FIG. 2 to couple between different input 1–5 and output 6–10 fibres. At wavelengths where the selected LCD mode is in the pure reflective state (0 degrees), the coupling is as follows Fibre 1 to fibre 10
Fibre 2 to fibre 9

Fibre 3 to fibre 8 (express path in to out)
Fibre 4 to fibre 7
Fibre 5 to fibre 6

At wavelengths where the selected mode is +0.0955 degrees, the wavelength from fibre 3 is now coupled to drop fibre 7 as seen below
Fibre 1 to fibre 9
Fibre 2 to fibre 8 (add path)
Fibre 3 to fibre 7 (drop path)
Fibre 4 to fibre 6

At wavelengths where the selected mode is −0.0955 degrees, the wavelength from fibre 3 is now coupled to drop fibre 9
Fibre 2 to fibre 10
Fibre 3 to fibre 9 (drop path)
Fibre 4 to fibre 8 (add path)
Fibre 5 to fibre 7

At wavelengths where the selected mode is +0.1910 degrees, the wavelength from fibre 3 is now coupled to drop fibre 6 as seen below
Fibre 1 to fibre 8 (add path)
Fibre 2 to fibre 7
Fibre 3 to fibre 6 (drop path)
Fibre 4 to fibre 5

At wavelengths where the selected mode is −0.1910 degrees, the wavelength from fibre 3 is now coupled to fibre 10 as seen below
Fibre 3 to fibre 10 (drop path)
Fibre 4 to fibre 9
Fibre 5 to fibre 8 (add path)
Fibre 6 to fibre 7

Selective attenuation of a particular wavelength channel can be achieved by attenuation of the individual coupling efficiency into modes and having a separate order which is used only for attenuation and is selectively excited at the expense of the efficiency of the selected order. In this way, the power at the selected order can be adjusted to a desired level. Additionally, a diffraction order can be used for monitoring purposes. Light can be coupled at one wavelength into the additional diffraction order—received on a photo detector and used as a monitor or control mechanism for the power levels in the system. This light could be collected by the addition of a fibre (single or multimode).

It is easy to generalize the principles here to other numbers of orders as required.

In a second further embodiment, the diffraction orders be addressed in a simple way and an electrode structure and driving scheme is proposed that can achieve this simply—though many alternative implementations are possible and the scope of the invention is not limited in any way to this method.

In the y-axis in which the wavelengths of light are resolved, one of 5 voltage functions Fyi(t) is applied to the electrode corresponding to the mode we wish to excite. Each of the electrodes corresponding to the subcells in the x-axis have voltage functions Fx(j). The voltage function is chosen such that the relationship between the top and bottom electrodes (Fyi(t)-Fxj(t)) for each of the subcells cells produces an AC component with a corresponding retardance to that required for the particular mode.

The exact form of these functions will depend on the linearity and frequency dependency of the exact liquid crystal used. To exemplify the approach a linear voltage retardance response and no frequency dependence is assumed.

In this case, the modes can be produced by using four different driving frequencies for the different orders of the induced grating. Each of the subcell electrodes is driven by a combination of the four frequencies with equal magnitude but a phase chosen to give Fyi(t)-Fxj(t), the correct AC component to achieve the required retardance. For example, when the phase of the drive frequency and the phase of the corresponding frequency component of the subcell is in phase there is no contribution to the AC voltage (with the only contribution being for the $2^{nd}$ to $4^{th}$ frequency components which is equal for all subcells and provides a bias voltage). Equally when the phase of the drive frequency and the phase of the corresponding frequency component of the subcell are $\pi$ out of phase, then the AC component is a maximum. In this cased the maximum AC component is chosen to achieve a retardance of $\pi/8$ and the minimum AC component is chosen to achieve a retardance of $\pi/2$. The two other states ($\pi/4$ retardance and $3\pi/8$ retardance) are achieved by phase delays in the corresponding subcells of $\pi/3$ and $2\pi/3$. So by control of the drive frequency and phase of Fy it is possible to choose between one of the four diffraction modes. When Fy is zero then the retardance of each subcell is equal so the induced grating is in a purely reflective state. FIG. 10(*a*) to FIG. 10(*d*) illustrate the corresponding driving arrangements. By using frequency components of 1 kHz, 2 kHz, 4 kHz and 8 kHz, each of the modes can be successfully driven to give a desired structure of the subcells. Similar approaches have been used to achieve grey level modulation in passive matrix displays by modulating in such a way as to create the correct RMS voltage level for the grey level being modulated.

Figure 11:
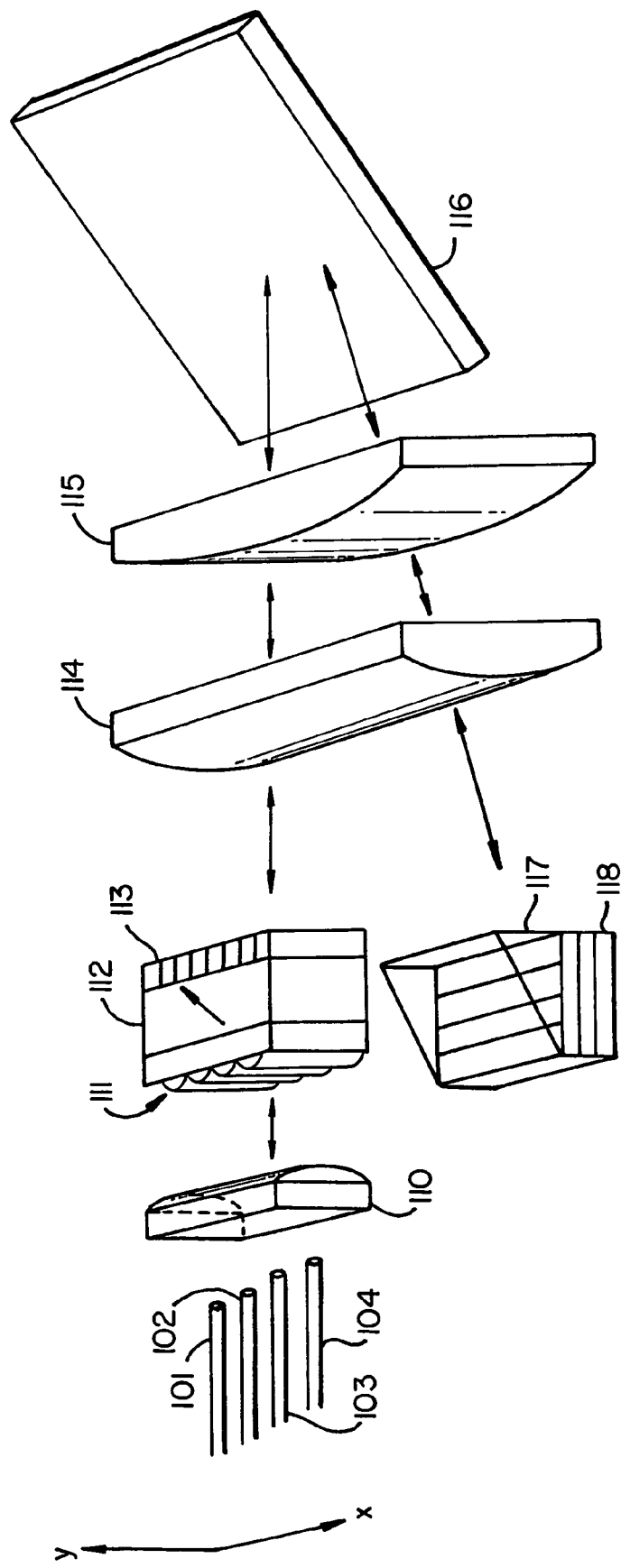
FIG. 11 illustrates schematically a further alternative embodiment of the present invention.

In a third embodiment the same objective is achieved efficiently employing a micro arrays of cylindrical lenses. The arrangement can be as illustrated in FIG. 11

In this case, there is provided an input array (in the x axis) of 2 fibres (101 and 102) and output array of 2 fibres (103 and 104) with a fibre spacing of 250 microns. The output of the fibres is coupled into a first micro cylindrical lens (110) to modify the divergence of the beam. The output is then coupled into an x-axis array of cylindrical lenses (111) with a separation corresponding to the fibre separation. The focal length of the lens 111 is chosen to be 500 micron so as to form a collimated beam of approximately 100 micron diameter. This beam is split in the x direction into two polarization states by a walk off crystal (112) of thickness 1.25 mm and then equalized in polarization by the polarization diversity optics 113 which can comprise an array of waveplates having a spacing of 125 microns. The output from the waveplates 113 consists of polarisation aligned beams. The waveplates can be produced by nano-optic lithographic techniques (as supplied by NanoOpto of Somerset, N.J.) or by an arrangement of standard quartz waveplate techniques.

Each of the output beams is then is projected to a first x-axis cylindrical lens 114 with a focal length of 5 cm which provides collimation in the x axis followed by a y axis cylindrical lens (115) with a focal length of 20 cm. Next the beams are reflecting from a grating (116) (1200 l/mm) at the near Littrow configuration. After the second pass of the x cylindrical lens the now diffracted beam resulting from the 100 micron diameter beam is collimated in the x direction—the combined effect of the double pass of the lens 115 and reflection from grating 116 being a compound reflective lens with focal length of approximately 10 cm.

The image of the reflected fibre is focused in the y direction by the y cylindrical lens producing a y focused but x-collimated beam. Typically the size of the beam at this point is highly asymmetric with radial dimensions of 20 microns in y and approximately 700 microns in x dimension. The image is wavelength dispersed in the y dimension and the individual channels can be accessed by a liquid crystal spatial light modulator (SLM) (118) after being folded down by a prism (117) to allow simple mounting of the SLM.

The SLM (118) is again able to direct the image of the light from input fibre (102) between the fibre drop port(103) or express port (104) by selection of the correct order of the induced grating when the light retraces its path through the system. Simultaneously, when the input light is directed to the drop port at a particular wavelength, the same wavelength will be directed from the add port (101) to the express port (104)

The reimaged light at the fibre port is again largely circular symmetric as the effects of the cylindrical lenses are reversed through the return propagation. Further, channel by channel attenuation control of optical power can be achieved by exciting a fraction of the power into an angle that doesn't correspond to an active port thereby attenuating the power in the chosen path.

The grating element (116) can be designed to reduce the x angular dependence of the grating by the use of a wedged prism which has an opposite angular dependence.

Further, the first cylindrical lens 114 can be replaced with a reflective cylindrical lens if a more compact design is desired without departing from the scope of this invention—though for clarity a transmissive cylindrical lens system has been described.

Figure 12:
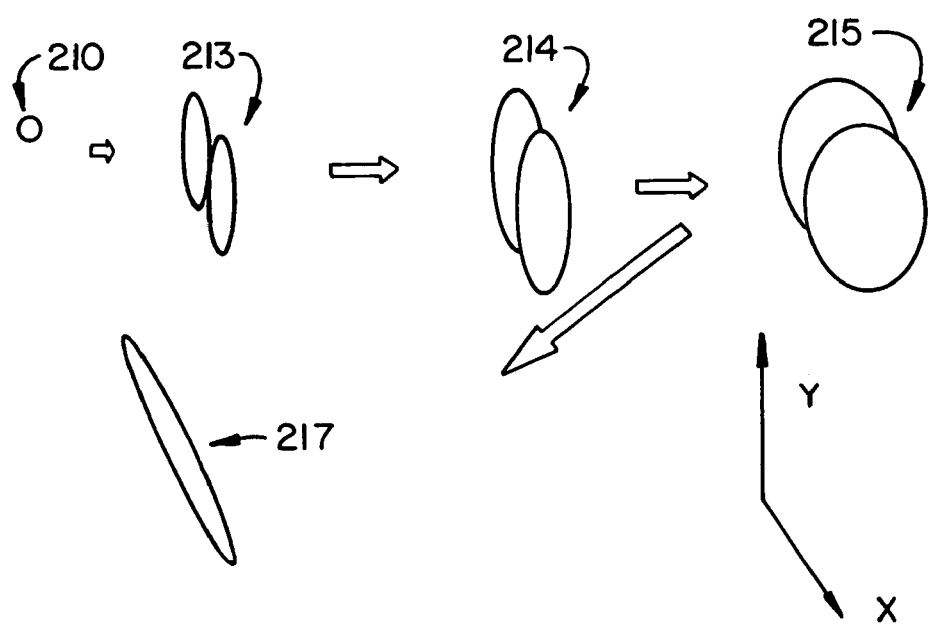
FIG. 12 illustrates the optical beam profile along the optical arrangement of FIG. 11

Turning now simultaneously to FIG. 12 and FIG. 11, there is illustrated the optical profile at various points along the optical pathway. The point 210 corresponds to the optical profile of the beams emitted fibres e.g. 110. The profile 213 corresponds to the optical profile of the light emitted from the element 113. Here the separate polarisation are split due to the waveplate 112. The profile 214 corresponds to the light emitted from the lens 114. The profile 215 corresponds to the light emitted from the lens 115 and the profile 217 corresponds to the light striking the SLM device 117, 118.

The foregoing describes preferred embodiments of the present invention. Modifications, obvious to those skilled in the art can be made thereto without departing from the scope of the invention.

I claim:

1. A wavelength selective manipulation device comprising:
    at least a first optical input port for inputting an optical signal including a plurality of wavelength channels;
    a first wavelength dispersion element for angularly dispersing the wavelength channels of said optical signal into angularly dispersed wavelength signals;
    an optical power element for focussing in the dimension of the angular dispersion said angularly dispersed wavelength signals such that said wavelength signals have an elongated optical intensity profile in the focal plane of said optical power element so as to form elongated spatially separated wavelength signals; and
    a spatial manipulation element for selectively spatially manipulating the characteristics of said elongated spatially separated wavelength signals to produce spatially manipulated wavelength signals.

2. A device as claimed in claim 1 further comprising:
    a first wavelength combining element for selectively combining said spatially manipulated wavelength signals together to produce a first output signal.

3. A device as claimed in claim 1 wherein said first wavelength dispersion element includes a diffraction grating.

4. A device as claimed in claim 3 wherein said diffraction grating is utilised substantially at the Littrow condition.

5. A device as claimed in claim 1 wherein said focussing element includes at least one cylindrical lens.

6. A device as claimed in claim 5 wherein said optical power element includes a spherical mirror.

7. A device as claimed in claim 1 wherein said spatial manipulation element comprises a spatial light modulator or liquid crystal display device.

8. A device as claimed in claim 7 wherein said liquid crystal display device is divided into a series of elongated cell regions substantially matching the optical intensity profile of said elongated spatially separated wavelength signals.

9. A device as claimed in claim 8 wherein said cell regions each include a plurality of drivable cells and wherein, in use, said cells are driven so as to provide a selective driving structure which projects a corresponding optical signal falling on the cell region substantially into one of a series of output order modes.

10. A device as claimed in claim 1 wherein said optical power element also includes a spherical mirror device.

11. A device as claimed in claim 1 wherein:
    when said spatial manipulation element is in a first state, first predetermined wavelengths input at said first optical input port are output at a first output port; and
    when said spatial manipulation element is in a second state, second predetermined wavelengths input at said first optical input port are output at a second output port.

12. A device as claimed in claim 11 wherein:
    when said spatial manipulation element is in said first state, first predetermined wavelengths input at a third optical input port are output at a fourth output port; and
    when said spatial manipulation element is in a second state, first predetermined wavelengths input at said third optical input port are output at said first output port.

13. A device as claimed in claim 1 wherein the optical intensity profile of each of the elongated spatially separated wavelength signals has an aspect ratio of greater than 10:1 in the plane of the spatial manipulation element.

14. A device as claimed in claim 1 wherein the optical intensity profile of each of the elongated spatially separated wavelength signals has an aspect ratio of approximately 35:1 in the plane of the spatial manipulation element.

15. A wavelength selective manipulation device comprising:
    4-a series of optical input and output ports including a first optical input port inputting an optical signal including a plurality of wavelength channels;
    a first wavelength dispersion element for angularly dispersing the wavelength channels of said optical signal into angularly dispersed wavelength signals;
    an optical power element for focussing said angularly separated wavelength signals into a series of elongated spatially separated wavelengths bands;
    a spatial manipulation element for selectively spatially manipulating the characteristics of said angularly separated wavelength bands to produce spatially manipulated wavelength bands; and
    said spatially manipulated wavelength bands being subsequently focused by said optical power element and combined in a spatially selective manner by said first wavelength dispersion element for output at said output ports in a spatially selective manner.

16. A method of providing wavelength selective separation capabilities for an optical input signal having multiple wavelength components, the method comprising the steps of:

(a) projecting the optical input signal against a grating structure so as to angularly separate said wavelength components;

(b) focussing each of said wavelength components into an elongated wavelength component element having an elongated optical intensity profile;

(c) independently manipulating said elongated wavelength component element; and (d) combining predetermined ones of said manipulated elongated wavelength components.

17. A method as claimed in claim 16 wherein said focussing step includes utilising a cylindrical lens to focus the wavelength components.

18. A method as claimed in claim 16 wherein said focussing step includes utilising a spherical mirror to focus the wavelength components.

19. A method as claimed in claim 18 wherein the optical intensity profile of each of the elongated wavelength component element has an aspect ratio of greater than 10:1.

20. A method as claimed in claim 16 wherein said step (c) includes utilising a liquid crystal display device to separately manipulate each of the wavelength components.

21. A method as claimed in claim 20 wherein said liquid crystal display device is divided into a series of elongated cell regions substantially matching said optical intensity profile of said wavelength component elements.

22. A method as claimed in claim 21 wherein said cell regions each include a plurality of drivable cells and wherein, in use, said cells are driven so as to provide a selective driving structure which projects a corresponding optical signal falling on the cell region substantially into one of a series of output order modes.

23. A method as claimed in claim 16 wherein said focussing step includes utilising a spherical mirror.

24. A wavelength selective manipulation device comprising:

a at least a first optical input port for inputting an optical signal including a plurality of wavelength channels;

polarisation alignment element for aligning the polarisation state of said optical signal;

a wavelength dispersion element for angularly dispersing the wavelength channels of said optical signal into angularly dispersed wavelength signals;

an optical power element for focussing the angularly dispersed wavelength signals into a series of elongated spatially separated wavelength signals; and a spatial manipulation element for selectively spatially manipulating the characteristics of said spatially separated wavelength bands to produce spatially manipulated wavelength bands.

25. A wavelength selective manipulation device comprising:

a series of optical input and output ports including a first optical input port inputting an optical signal including a plurality of wavelength channels;

a first wavelength dispersion element for angularly dispersing the wavelength channels of said optical signal into angularly dispersed wavelength signals;

an optical power element for focussing said angularly separated wavelength signals such that said wavelength signals have an elongated optical intensity profile in the focal plane of said optical power element so as to form elongated spatially separated wavelength signals;

a spatial manipulation element for selectively spatially manipulating the characteristics of said elongated spatially separated wavelength signals to produce spatially manipulated wavelength signals; and said spatially manipulated wavelength signals being subsequently focused by said optical power element and combined in a spatially selective manner by said first wavelength dispersion element for output at said output ports in a spatially selective manner.

* * * * *

UNITED STATES PATENT AND TRADEMARK OFFICE
CERTIFICATE OF CORRECTION

PATENT NO. : 7,092,599 B2  Page 1 of 1
APPLICATION NO. : 10/706901
DATED : August 15, 2006
INVENTOR(S) : Steven James Frisken It is certified that error appears in the above-identified patent and that said Letters Patent is hereby corrected as shown below:

Column 10 at line 49, Claim 15: delete "4-".

Signed and Sealed this

Twenty-sixth Day of December, 2006

JON W. DUDAS
*Director of the United States Patent and Trademark Office*